Aug. 26, 1969     F. D. HALL ETAL     3,462,872

TRAP SETTER

Filed Sept. 29, 1967

INVENTORS
FLOYD D. HALL
CHARLES A. HALL

United States Patent Office 3,462,872
Patented Aug. 26, 1969

3,462,872
TRAP SETTER
Floyd D. Hall and Charles A. Hall, both of
R.R. 2, Creston, Iowa 50801
Filed Sept. 29, 1967, Ser. No. 671,692
Int. Cl. A01m 23/28
U.S. Cl. 43—97                                         5 Claims

ABSTRACT OF THE DISCLOSURE

A device for setting traps which includes a hollow tube open at its upper end and having a vertical slot, and a rod which is slidably received within the tube. The tube has a hook at its upper end, above the slot, and a foot ring secured to its opposite end. The rod has a handle at one end and a hook rotatably connected to the other end, the hook extending through the slot for sliding movement therein. The rod has spaced, vertically aligned notches intermediate its ends, which are engaged by lock means carried by the tube. The device can be manually operated to compress and hold the spring of animal traps and the like in order that the jaws of the trap can be easily moved into position to set the trap with complete safety and minimum effort.

Summary of the invention

Our device comprises a hollow tube disposed vertically with a top mounted hook and a bottom mounted foot ring. The tube has a vertical slot extending between the top hook and the ring. A slide rod vertically movable up and down in the tube is secured to a bottom hook extending through the slot.

A user places the foot ring on the ground with one foot therethrough to hold the device in place. The spring to be compressed is disposed between the hooks and the rod is pulled upwards out of the tube until the hooks are pulled toward each other and the spring is compressed. Manually operable locking means can lock the rod releasably in the desired position.

Our device can be used for all size traps; it can be easily operated anywhere with the use of one hand; it is quickly operated and is completely safe.

Detailed description of preferred embodiment

Figure 1:
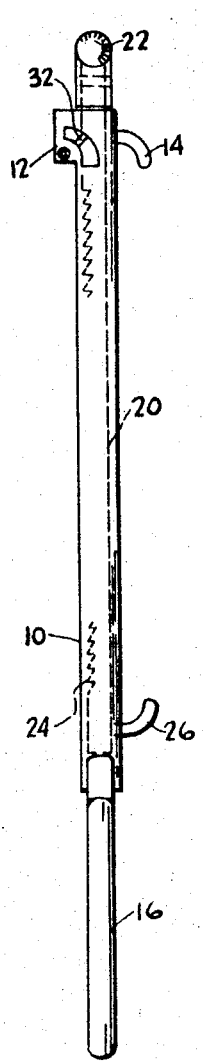
FIG. 1 is a side view of our device.
Figure 2:
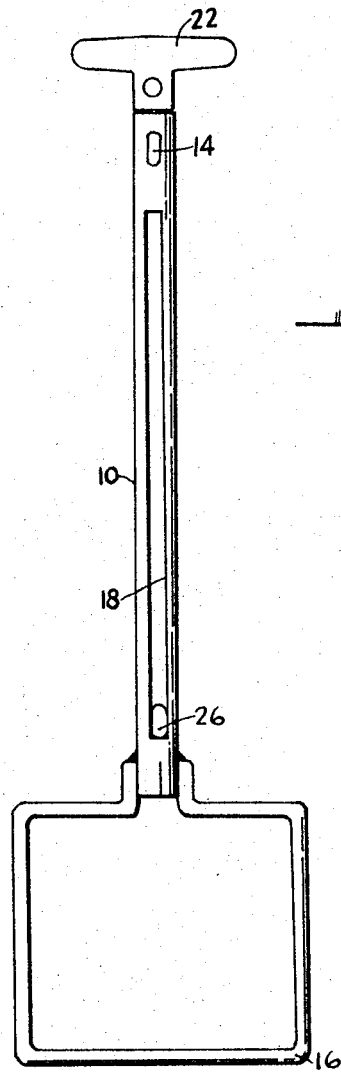
FIG. 2 is a front view thereof.
Figure 8:
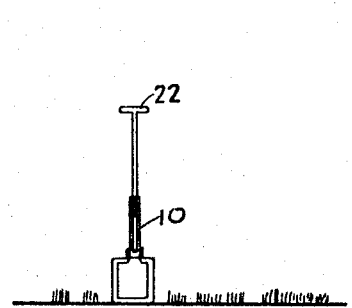
FIG. 8 is a front view of our device in spring compressing position.
Figure 7:
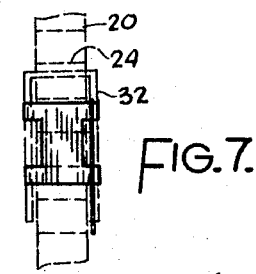
FIG. 7 is a view through line 7—7 in FIG. 6.
Figure 6:
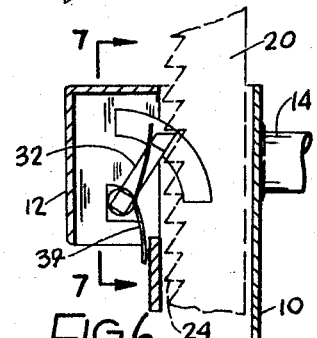
FIG. 6 is an enlarged detail view of the locking mechanism.
Figure 3:
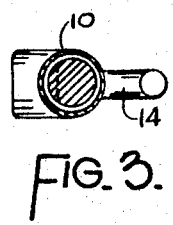
FIG. 3 is a view through line 3—3 in FIG. 4.
Figure 4:
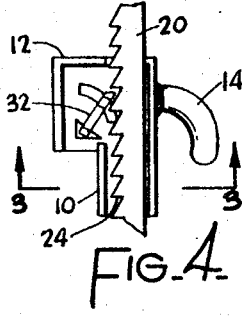
FIG. 4 is a detail view of the locking mechanism.
Figure 5:
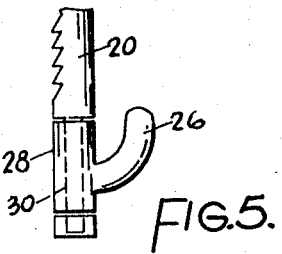
FIG. 5 is a detail view of the bottom hook.

Referring now to FIGS. 1–8, a hollow vertical tube 10 has an enlarged chamber 12 at the top end and an oppositely disposed downwardly extending hook 14 also secured to the top end. The bottom end of the tube is secured to the top end of a vertical foot ring 16. Tube 10 also has an elongated vertical slot 18 extending between hook 14 and ring 16.

A vertical rod 20 extends downwardly in the tube and is fixedly secured at its top end to horizontal handle 22. Rod 20 has a plurality of vertically aligned and displaced, horizontally extending notches 24 which extend about a small portion of the periphery of the rod. By pulling or pushing on the handle, the rod can be moved up and down in the tube. By turning the handle, the rod can be rotated about its own axis.

A second, upwardly extending hook 26 extends through the slot and has a body portion 28 in the tube rotatable about an axle 30 secured to the bottom end of the rod whereby when the rod is moved up and down, hook 26 slides in the slot toward and away from hook 14, but when the rod is rotated, the hook 26 remains in the slot and does not rotate.

Compartment 12 contains a catch lever 32 pivotally secured at one end and spring loaded by spring 34.

When the handle is turned to a first position parallel to the ring, the other end of lever 32 engages one of the notches and the rod is locked into position to maintain a selected distance between the hooks. (This distance can be varied by selecting the notch which engages the lever.) When the handle is rotated to a second position perpendicular to the ring, the notches are rotated out of engagement with the lever and the rod can be easily moved up or down in the tube as desired. With the lever engaging a notch, the rod can be pulled up easily due to a ratchet like action, but cannot be moved downward.

To operate the setter, place the foot ring on ground with one foot through ring to hold setter in place. With handle in down position and parallel to foot ring, place each eye of a trap spring inside hooks on setter. Pull handle up as far as possible. The lock will engage a notch in the slide rod and will lock in that position. Hook the spring hook provided on the trap to hold the trap spring compressed. Twist handle ¼ turn either direction and lock will release. Handle can then be pushed down and is ready for use on another spring trap. The above method is used only on the large size traps.

To use on the smaller sizes, instead of placing hooks of setter in spring eyes, place the hooks over spring directly behind eyes. Setter now is operated same as above.

Advantages of this setter are, for example, that only one setter will handle all size traps. It is a fast, easy, and safe way to set the above listed traps. It can be used while the operator is standing on land or in water, or while sitting in a boat. The setter can easily be operated with one hand, which enables a person to easily release himself should he accidentally get a hand or arm snapped in a trap.

While we have described our invention with particular reference to the drawings, other modifications are contemplated as coming within the scope of the invention.

Having thus described our invention, we claim as new and desire to secure by Letters Patent:

1. A trap setter comprising:
    a vertical hollow tube provided with an elongated vertical slot extending towards both ends thereof;
    a foot ring secured to the bottom end of the tube;
    a first downwardly extending hook secured to the top end of the tube and aligned with the slot;
    a second upwardly extending hook slidably disposed in the slot and aligned with the first hook;
    first manually operated means for moving said second hook in the slot toward and away from the first hook; and
    second releasable means for locking said first means in place to maintain any desired separation between said hooks.

2. A setter as set forth in claim 1 wherein said first means includes a rod slidable up and down in the tube and rotatable about its own axis.

3. A setter as set forth in claim 2 wherein said first means further includes a rotatable connection between the bottom end of the rod and the second hook that enables the second hook to be moved up and down with the rod but also enables the second hook to remain nonrotatably in the slot when the rod is rotated.

4. A setter as set forth in claim 3 wherein said rod has a plurality of vertically aligned and separated, and horizontally extending notches which extend about a portion of the rod periphery and which cooperate with the second means.

5. A setter as set forth in claim 4 further including a handle fixedly secured to the top end of the rod for rotating or for moving same up and down in the tube, said handle having a first position of rotation at which said second means engages the notches for locking action and a second position of rotation at which the notches are displaced from the second means and the rod can be moved freely up and down in the tube.

References Cited

UNITED STATES PATENTS

| | | | |
|---|---|---|---|
| 1,382,520 | 6/1921 | Lundene | 119—153 |
| 1,463,776 | 7/1923 | Knudtson | 119—153 |
| 2,494,567 | 1/1950 | Lines | 43—97 |

SAMUEL KOREN, Primary Examiner

J. H. CZERWONKY, Assistant Examiner